March 3, 1936.  E. P. GOLDEN  2,032,697
AUTO TRAILER
Filed July 9, 1934  2 Sheets-Sheet 1
Fig. 1.
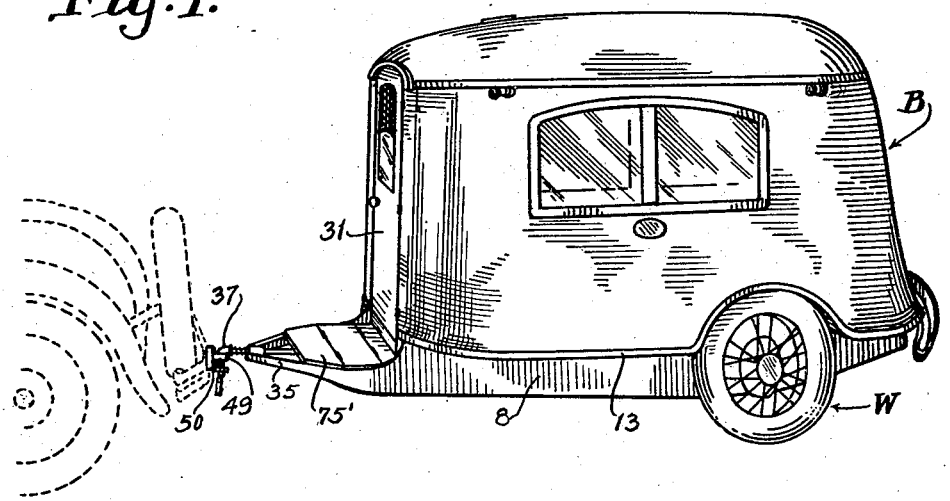
Fig. 2.
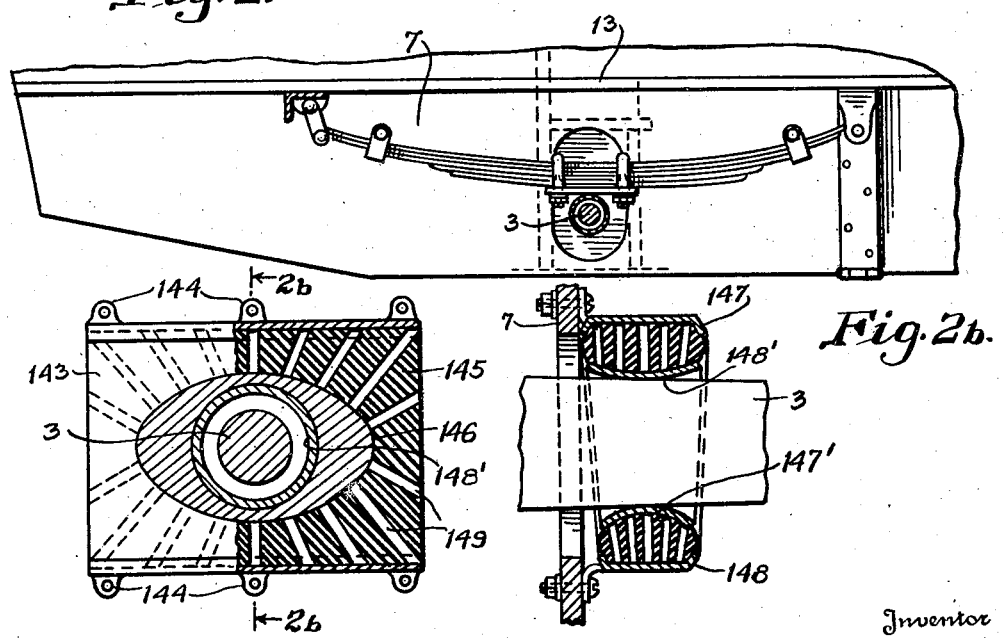
Fig. 2a.
Fig. 2b.
Inventor
E. P. GOLDEN
By Mason Fenwick Lawrence
Attorneys

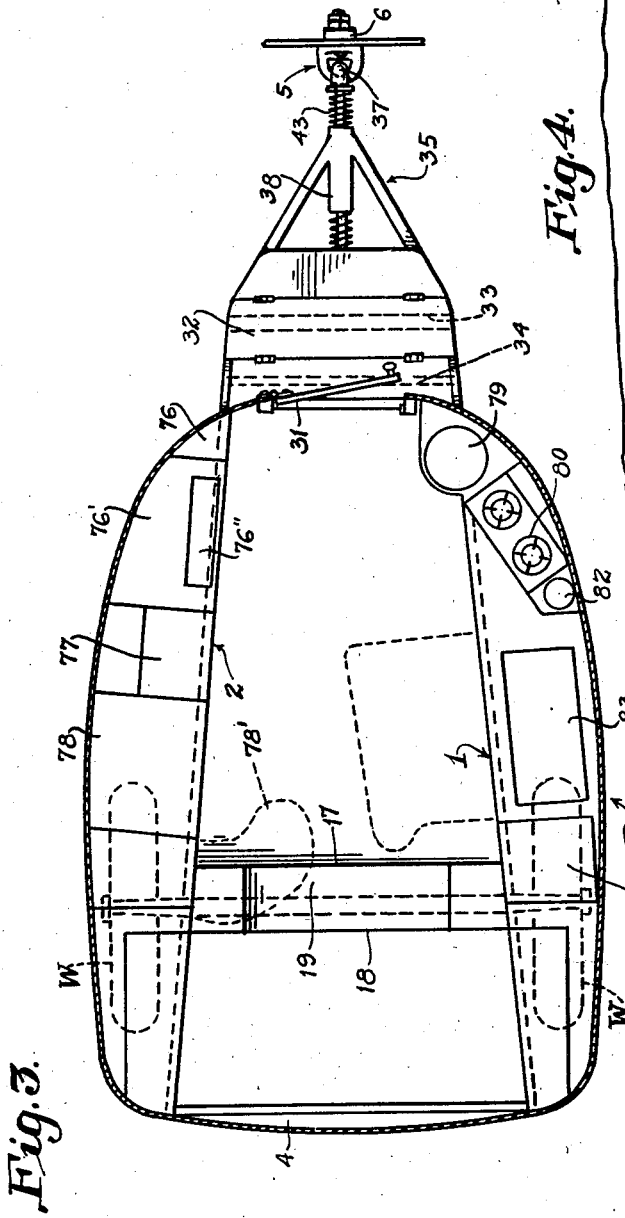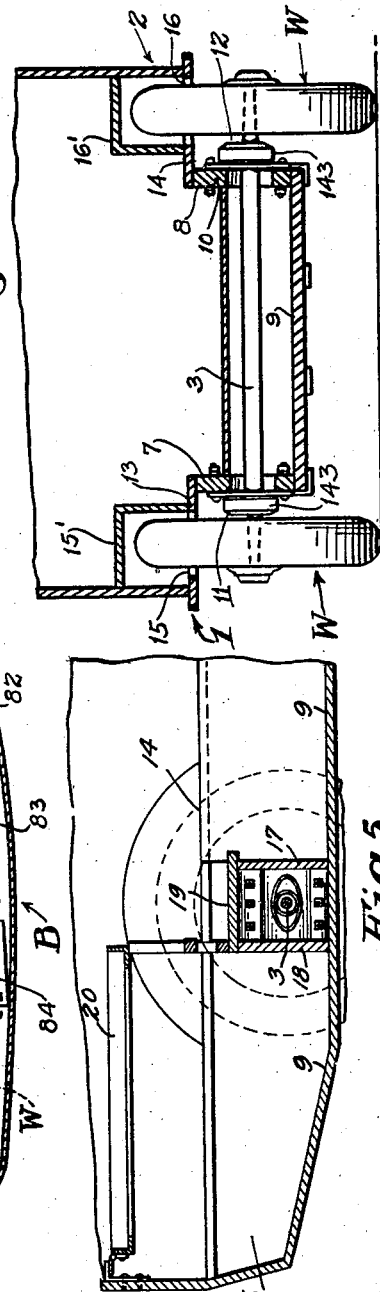

Patented Mar. 3, 1936

2,032,697

UNITED STATES PATENT OFFICE 2,032,697

AUTO TRAILER

Ephraim P. Golden, St. Petersburg, Fla.

Application July 9, 1934, Serial No. 734,391

6 Claims. (Cl. 280—106.5)

The invention forming the subject matter of this application is a trailer of the three-point suspension type designed for pivotal connection to the rear end of a power propelled road vehicle, and provided with practically all the conveniences of a home.

The main object of the invention is to provide a trailer of small weight and sturdy construction, and adapted for connection to the power car so as to have practically no effect on the speed thereof.

Another object of the invention is to provide a trailer in which a drop floor is employed throughout the greater part thereof to enable persons of average height to move about the interior thereof without bending.

A further object of the invention resides in the provision of shock absorbing mechanism for connecting the trailer pivotally to the power car, whereby the inertia shocks of the trailer caused by the stopping or starting of the power car are greatly reduced or eliminated.

Another object of the invention resides in the provision of an air-cushioned rubber block as a substitute for the usual leaf springs supporting a vehicle body on the wheels thereof.

Other objects of the invention will become apparent as the detailed description thereof proceeds.

In the drawings:

Figure 1 is a perspective view of the trailer embodying the present invention as applied to the rear end of a propelling automobile;

Figure 2 is a fragmentary side elevation of one of the spring supports for chassis of the trailer;

Figure 2—a is a part side elevation and part longitudinal section of an air cushioned rubber block, used in place of the ordinary vehicle springs;

Figure 2—b is a section taken on line 2b—2b of Figure 2—a;

Figure 3 is a diagrammatic layout in plan of the trailer, illustrating the arrangement of the interior furnishings thereof;

Figure 4 is a fragmentary vertical transverse section of the chassis, taken through the axis of the wheels supporting the rear end of the trailer;

Figure 5 is a fragmentary longitudinal section through the rear end of the chassis of the trailer.

As shown in the drawings, the trailer forming the present invention is of the three-point suspension type in which the front end is pivotally connected to any suitable fixture at the rear end of a power car. The coach or body of the trailer is supported on framework which includes box sills 1 and 2 constructed to receive the axle 3 which supports the wheels W of the trailer. These box sills are spaced widely apart at their rear end and gradually converge toward in the front end of the trailer, sufficiently to form a support for a full length bed 4. The foremost ends of the sills 1 and 2 support the platform with its framing converging in the direction of the pivotal connection 5 between the trailer and a bracket 6 suitably secured to the rear end of the chassis of the power car.

The sills 1 and 2 comprise the converging vertical walls 7 and 8 of the sunken structure secured and braced in spaced apart relationship with the drop floor 9, suitably secured to the lower edges of said sills; and by such transverse braces as may be found necessary to form a rigid chassis for the body B of the trailer.

The box sills of the sunken structure are provided with apertures 9 and 10, respectively, sufficiently large enough to permit unrestricted movement of the axle 3, which is supported by the springs 11 and 12, having their outer ends connected by the usual spring shackles to the bottom side of the horizontal side platforms 13 and 14 forming the mezzanine floor and suitably secured to the outside walls of the box sills, respectively. Slots 15 and 16 in the platforms 13 and 14 receive the upper parts of the wheels W; and casings 15' and 16' are constructed on said platforms to receive said parts.

The axle 3 is enclosed by a transverse casing having vertical walls 17 and 18 (see Figures 3 and 5) extending as braces between said box sill, vertical walls 7 and 8.

At their front end, the side walls 7 and 8 are braced apart by transverse struts 33 and 34; and, have secured to their outer end a triangular draw-bar frame, designated generally by the reference character 35 and slidably supporting a draw-bar 36 having a coupling hook 37 formed on one end thereof.

Bearings 38 and 39 for the rod 36 are formed on the draw-bar frame. A cylindrical shoulder 42 is formed on rod 36 adjacent the hook 37, and a compression spring 43 is interposed between the shoulder 42 and the outer end of the bearing 38. A second compression spring 44 is interposed between the inner end of the bearing 38 and a collar 45 adjustably secured, as by a set screw 46, in proper position on the rod 36.

The chassis of the trailer may be secured by the usual leaf spring arrangement shown in Figure 2 of the drawings. In order to reduce the weight and cost and eliminate squeaks as much as possible, I prefer to use the air cushioned rubber block construction shown in Figures 2—a and 2—b of the drawings. Each of these blocks comprises a metal box 143 provided with lugs 144 adapted to be bolted or otherwise secured to the outside of the vertical walls of the sills. A rubber block 145 having a substantially elliptical aperture 146 extending therethrough is suitably secured in the box 143, as by the inturned flanges 147 and 148 shown in Figure 2—b of the drawings. The curved edge of elliptical aperture 146 is made convex in cross section to receive the concave groove 147' of a metal shoe 148' which is provided with an aperture 149 forming a bearing for the axle 3. The rubber block 145 is provided with radiating bores to enhance the resilience of the material in the block.

By the air cushion block just described, the bouncing of the body on the axle will be eased considerably. The harder the bounce the tighter the holes will seal themselves against the box plate supports and the axle shoes, thus giving the effect of air cushion rubber pads. The shoe on the axle and the box on its chassis are edged to compact the rubber on the pressure bounce. The top portion should be somewhat greater than the bottom portion, for the sake of the load; and the lower portion of the cushion is intended to check the rebounce. The flaring edges allow the same to hold the axle in proper alignment; still with this cushion there is ample freedom to take care of unevenness in rough road shocks.

What I claim is:

1. In an auto trailer, a pair of wheels connected by an axle, a frame having a part arranged between said wheels and supported thereby, said frame including sills through which the opposite ends of said axle extend, and a drop floor secured to the lower edges of said sills on opposite ends of and below said axle.

2. In an auto trailer, a pair of wheels connected by an axle, a frame having a part arranged between said wheels and supported thereby, said frame including sills through which the opposite ends of said axle extend, a drop floor secured to the lower edges of said sills on opposite ends of and below said axle, and a casing for said axle within said frame and supported by the drop floor to form a seat or step.

3. In an auto trailer, a pair of wheels connected by an axle, a frame having a part arranged between said wheels and supported thereby, said frame including sills through which the opposite ends of said axle extend, a drop floor supported by the lower edges of said sills on opposite ends of and below said axle, a casing for said axle within said frame and supported by the said sills and projecting from the drop floor to form a seat or step, platforms extending along opposite sides of said frame and supported by the upper edges of said sills, the upper parts of said sills uniting with the supporting platforms, and a closed body united with said platforms and resting on the box sills.

4. In an auto trailer, a pair of wheels connected by an axle, a frame having a part arranged between said wheels and supported thereby, said frame including sills through which the opposite ends of said axle extend, a drop floor secured to the lower edge of said sills on opposite ends of and below said axle, a casing for said axle supported by the drop floor to form a seat, supporting platforms secured to and supported by the upper edges of said sills, and a closed body supported by said platforms.

5. In a vehicle, the combination of a body frame and axle, boxes secured to said frame and surrounding the opposite ends of said axle, cushions of resilient material secured in said boxes and provided with elliptical apertures within which the ends of said axle are centered, the walls of said apertures being convex, elliptical metallic shoes within said apertures and having concave walls closely fitting the convex walls of said cushions, the opposite ends of said axle being supported by the convex inner walls of said shoes.

6. In a vehicle, the combination of a body frame and axle, boxes secured to said frame and surrounding the opposite ends of said axle, cushions of resilient material secured in said boxes and provided with elliptical apertures within which the ends of said axle are centered, the walls of said apertures being convex, elliptical metallic shoes within said apertures and having concave walls closely fitting the convex walls of said cushions, the opposite ends of said axle being supported by the convex inner walls of said shoes, said cushions being provided with air receiving boxes extending normal to the elliptical apertures thereof.

EPHRAIM P. GOLDEN.